Oct. 19, 1971 W. GRIFF 3,613,230

METHOD OF FABRICATING COAXIAL CIRCUITRY

Filed April 29, 1969 3 Sheets-Sheet 1

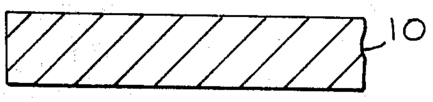

COPPER BASE PLATE

Fig. 1

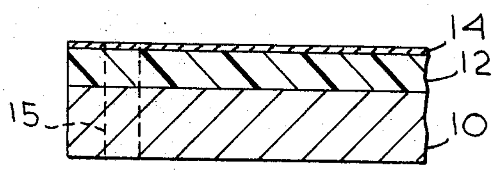

FIRST DIELECTRIC & COPPER FOIL SHEETS LAMINATED TO BASE PLATE & REGISTRATION HOLES DRILLED

Fig. 2

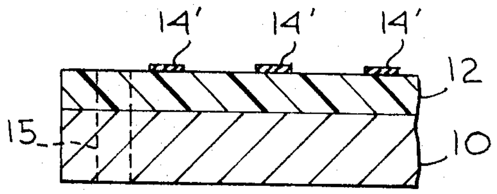

FIRST COPPER FOIL LAYER SELECTIVELY ETCHED TO FORM CENTER COAXIAL CONDUCTORS

Fig. 3

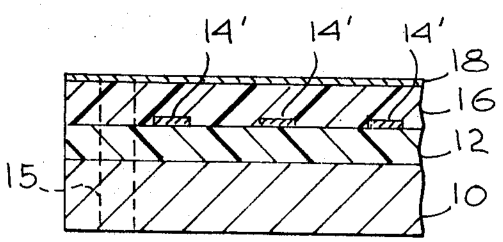

SECOND DIELECTRIC & COPPER FOIL LAYERS LAMINATED ON CENTER COAXIAL CONDUCTORS & REGISTRATION HOLES EXTENDED THERETHROUGH

Fig. 4

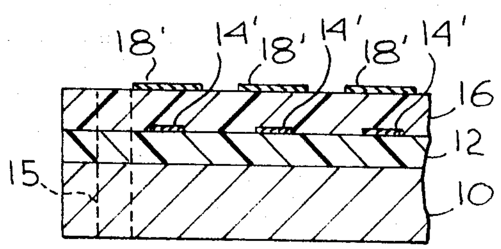

SECOND COPPER FOIL LAYER SELECTIVELY ETCHED TO PROTECT DIELECTRIC AREAS TO BE RETAINED

Fig. 5

INVENTOR
WILLIAM GRIFF
BY Nathan Cass
ATTORNEY

METHOD OF FABRICATING COAXIAL CIRCUITRY

Filed April 29, 1969 3 Sheets-Sheet 2

INVENTOR
WILLIAM GRIFF
BY Nathan Cass
ATTORNEY

Oct. 19, 1971 W. GRIFF 3,613,230

METHOD OF FABRICATING COAXIAL CIRCUITRY

Filed April 29, 1969

3 Sheets-Sheet 3

INVENTOR
WILLIAM GRIFF
BY Nathan Cass
ATTORNEY

United States Patent Office 3,613,230
Patented Oct. 19, 1971

3,613,230
METHOD OF FABRICATING COAXIAL CIRCUITRY

William Griff, Tarzana, Calif., assignor to The Bunker-Ramo Corporation, Oak Brook, Ill.

Filed Apr. 29, 1969, Ser. No. 820,108
Int. Cl. B41m 3/08; H05k 3/00
U.S. Cl. 29—624 R 8 Claims

ABSTRACT OF THE DISCLOSURE

A method of fabricating microminiaturized coaxial circuitry in which laminating techniques are combined with selective etching and electroforming techniques to obtain a high order of dimensional precision at reasonable cost.

The invention herein described was made in the course of or under a contract or subcontract thereunder, with United States Army Engineer Research and Development Laboratories.

This invention relates to an improved method for fabricating shielded circuit conductors of the microminiaturized coaxial type.

In recent years, considerable attention has been given to techniques for fabricating microminiaturized coaxial circuitry, as indicated for example by the techniques and constructions disclosed in U.S. Pats. Nos. 3,351,702; 3,351,816; 3,351,953; and 3,391,454.

In accordance with the objects and purposes of the present invention, an improved integrated microminiature planar coaxial system is provided which, by a novel combination of laminating techniques in conjunction with selective etching and electroforming techniques, permits achieving a high order of dimensional precision at reasonable cost.

Briefly, in a preferred embodiment of the invention, the system is built up from a conductive base by laminating thereon, in a series of steps, precisely dimensioned alternate layers of copper foil and epoxy resin. Selective etching is used at appropriate stages to form the center conductors and to remove unwanted dielectric portions. Electroforming techniques are then used to complete the conductive encirclement of the center conductors and to provide a top layer of the required final thickness. Provision for making interconnections to the central conductors is accomplished by drilling holes in appropriately located dielectric-filled slots chemically milled in the outer plates, each hole having a conductive layer formed therein to provide electrical connection to a respective central conductor intercepted thereby.

Figure 6:
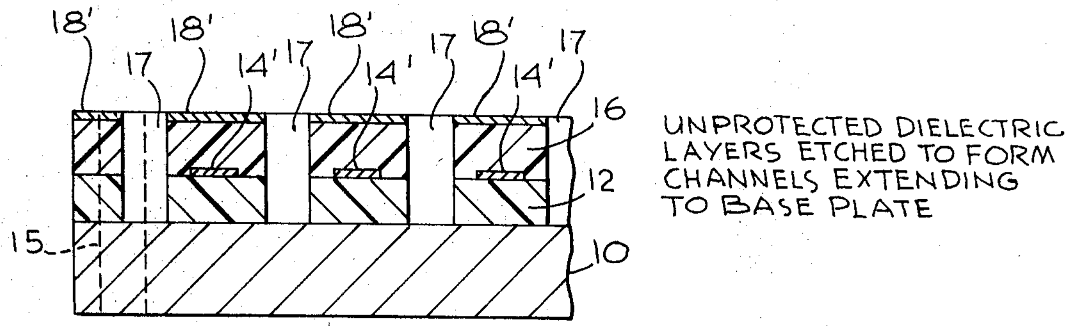
Figure 7:
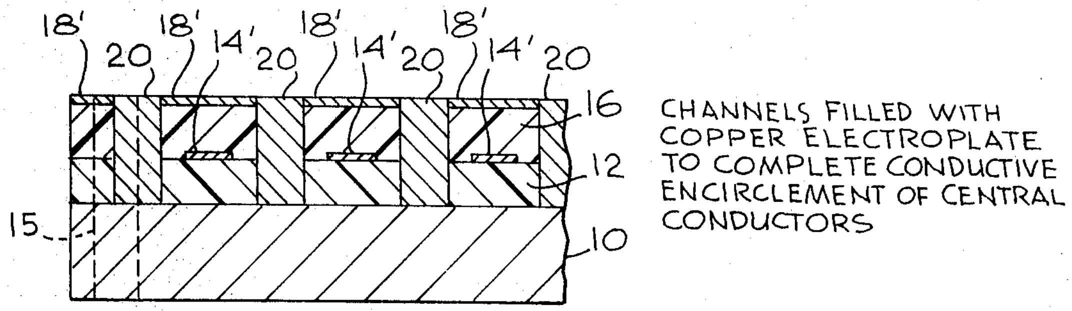
Figure 8:
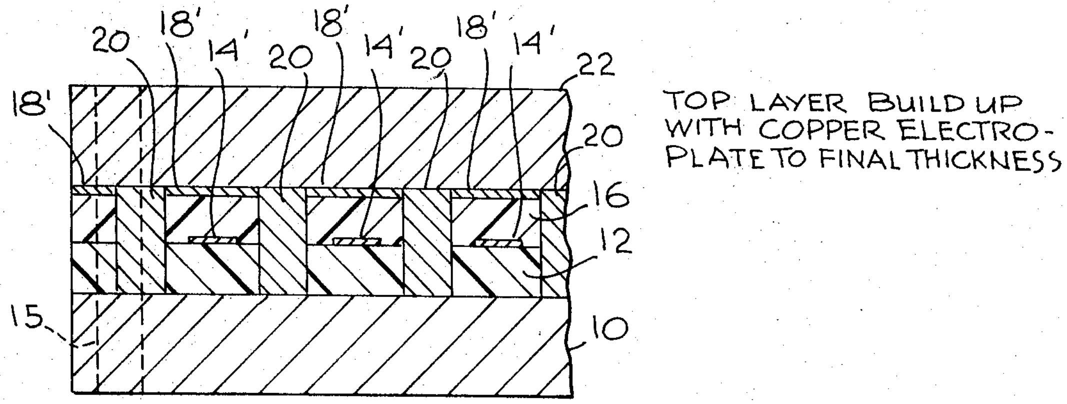
Figure 9:
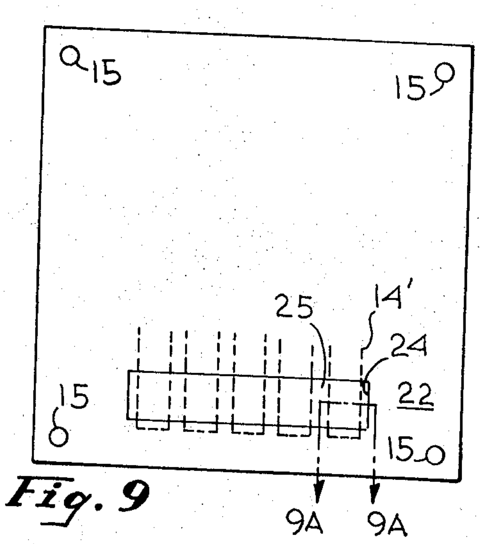
Figure 9A:
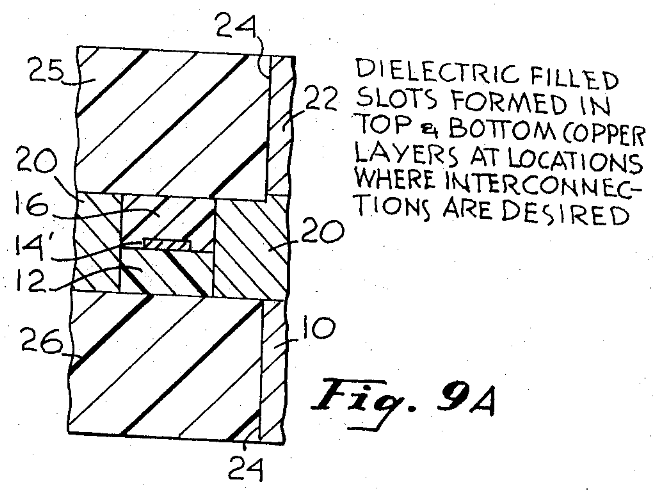
Figure 10:
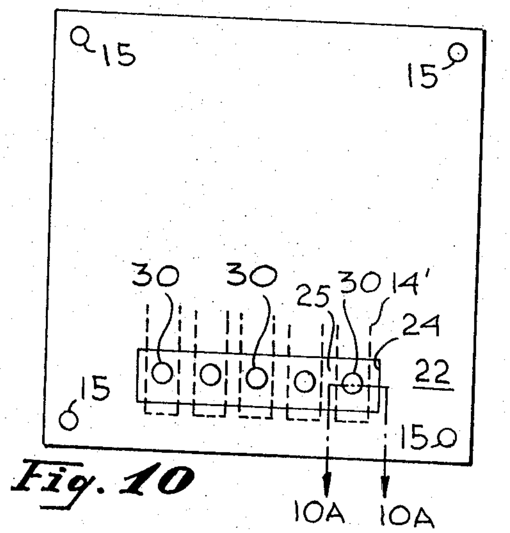
Figure 10A:
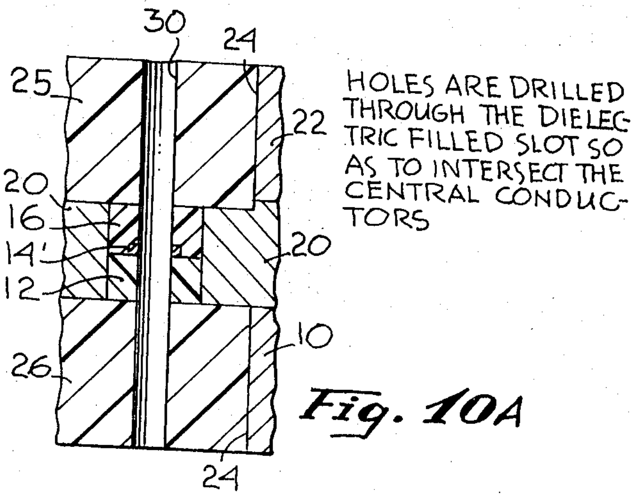
Figure 11:
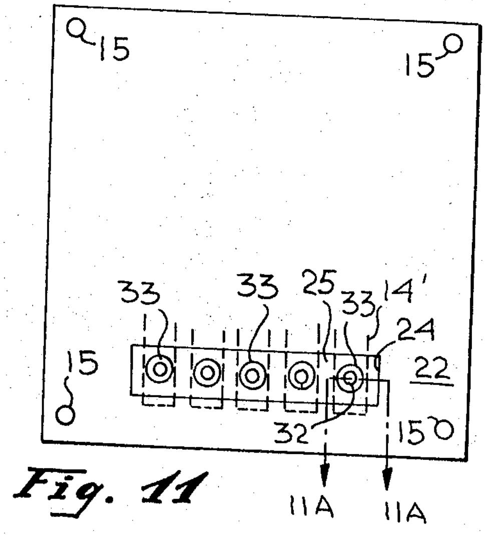
Figure 11A:
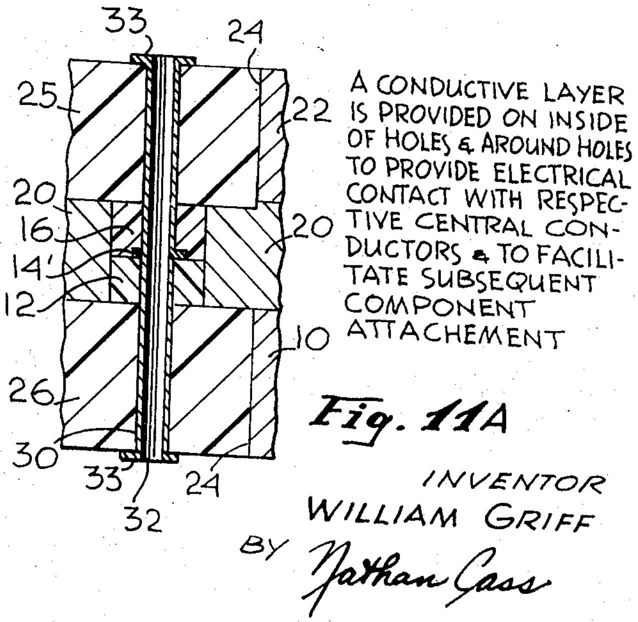

The specific nature of the invention as well as other objects, advantages, and uses thereof will become evident from the following description of a preferred embodiment taken in conjunction with the accompanying drawings, in which:

FIGS. 1–8 are fragmentary cross-sectional views illustrating various stages of construction in preparing planar coaxial circuitry in accordance with the invention; and FIGS. 9, 9A, 10, 10A, and 11, 11A are plan and cross-sectional views illustrating various stages of construction in providing for interconnections to the center conductors of the fabricated coaxial circuitry illustrated in FIG. 8. FIGS. 9A, 10A, and 11A are enlarged cross-sectional views of FIGS. 9, 10 and 11, respectively, taken along the lines indicated.

Like characters refer to like elements throughout the figures of the drawings.

Referring initially to FIGS. 1–3, illustrated therein are various exemplary stages in the fabrication of the center conductors of coaxial circuitry in accordance with the invention.

FIG. 1 illustrates a pure copper sheet which may be employed as a base plate 10 for the coaxial circuitry to be fabricated, the thickness of the plate 10 being that required for the final base thickness of the completed structure. The plate 10 is of sufficient size to include the desired coaxial circuitry and to provide a suitable border area for processing requirements.

As illustrated in FIG. 2, a dielectric layer 12, such as epoxy, having a copper foil layer 14 is laminated on the copper base plate 10 using conventional lamination techniques involving the application of pressure and heat. The dielectric layer 12 is typically a semi-cured epoxy resin material which is polymerized during lamination to securely bond the copper layer 14 to the copper base plate 10. The thickness of the copper layer 14 is that required for the center conductors of the coaxial circuitry. The pressed layer thickness of the dielectric layer 12 following lamination is chosen to be that required for the final desired thickness of the dielectric below the center conductors. The dielectric layer 12 thus serves the dual purpose of facilitating lamination of the copper layer 14 to the copper base plate 10 and providing electrical insulation therebetween. After lamination of the dielectric and copper layers 12 and 14, registration holes are drilled as illustrated in FIG. 2 by the hole 15. These registration holes are used to provide registration references throughout the fabrication.

The next step, as illustrated in FIG. 3, is to form the copper layer 14 into a desired pattern corresponding to the circuit configuration required for the center conductors 14' of the coaxial circuitry being fabricated. This may be accomplished using known selective etching techniques as follows. A photoresist is applied to the top surface of the copper layer 14 and to the bottom surface of the copper base plate 10, the copper layer 14 being exposed in accordance with the configuration required for the center conductors 14'. The structure is then processed through a conventional ferric chloride etchant for removal of the copper from areas containing unexposed photoresist. The ferric chloride etchant typically has a concentration in the range of 38° to 40° Baumé and an operating temperature in the range of 110° F. to 120° F. A planetary type etcher rotating the work may be used to obtain precise etching. After a time sufficient to provide the desired etching, the structure is removed from the etchant, neutralized such as in a 5% solution of hydrochloric acid, thoroughly rinsed in running water, and then dried in a Trisec type dryer. The center conductors 14' may typically have a final thickness of 0.001 inch, and the pressed thickness of of the dielectric layer 12 below the conductors 14' may typically be 0.015 inch.

Having formed the center conductors 14' as illustrated in FIG. 3, the conductive encirclement of each center conductor 14' is next accomplished as illustrated by the exemplary stages of FIGS. 4–8.

As shown in FIG. 4, a second dielectric layer 16 and copper foil layer 18 are laminated over the center conductors 14'. The dielectric layer 16 and copper foil layer 18 may be the same as the dielectric and copper foil layers 12 and 14, respectively. Also, the pressed thickness of the dielectric layer 16 above the center conductors 14' is made equal to that of the dielectric layer 12 below the conductors 14'. In other words, after the second lamination, each conductor 14' will be in the center of the combined thickness of the dielectric layers 12 and 16, which combined thickness may typically be 0.030 inch. The registration holes are extended through the second lamination dielectric and copper layers 16 and 18 as illustrated in FIG. 4 by the hole 15.

FIG. 5 illustrates the next step in the fabrication process, which is to form the second copper foil layer 18 into a predetermined pattern 18' in order to provide protection for predetermined portions of the surface of the dielectric layer 16 preparatory to completing the conductive encirclement of each center conductor 14'. It will be understood that the predetermined pattern 18' may be formed using the same selective etching technique previously described with regard to the formation of the pattern of the center conductors 14'.

As illustrated in FIG. 6, the portions of the dielectric layers 12 and 16 not protected by the pattern 18' are removed, such as by eching, to form channels 17 extending down to the copper base plate 10. Where the dielectric layers 12 and 16 are of epoxy material, the etchant used may be a chromate-sulfide type of solution which removes the unprotected epoxy at a controlled rate of, for example, one mil per five minutes. After the formation of the channels 17, any etching residues are removed, using, for example, an alkaline-hypophosphite solution.

The next step in the process, as illustrated in FIG. 7, is to fill the channels 17 with conductive material 20 in order to complete the conductive encirclement of each of the center conductors 14'. This is accomplished, for example, by using electroforming to build up the channels 17 with copper electroplate. Specifically, the electroforming process typically employs a cathode contact attached to the bottom of the copper base plate 10 of the structure of FIG. 6 which is entered with live contact into a copper electroforming solution. The bottom of the base plate 10 and the cathode are completely masked with a protective resist to prevent further deposition thereon. Periodic reverse current is used during the electroplating cycle to provide uniform leveling during the copper build-up in the channels 17.

When copper electroplate is built up in the channels 17 to the level of the top surface of the pattern 18', the structure is taken out of the electroforming solution, and the cathode contact removed. The protective resist is then removed from the bottom surface of the base plate 10, following which the top copper surface of the structure of FIG. 7 is sanded smooth and uniform. The top copper surface is then built up with copper electroplate to provide a resulting top plate 22 having the required final dimensional thickness, as illustrated in FIG. 8, which is preferably of the same thickness as the bottom base plate 10. Also, the registration holes are extended through the electroformed top plate 22, as illustrated by the hole 15 in FIG. 8.

Having described in connection with FIGS. 1–8 how coaxial circuitry may be fabricated in accordance with the invention, reference is now directed to FIGS. 9, 9A, 10, 10A, and 11, 11A, which illustrate how provision may typically be made for making electrical interconnections to one or more of the center conductors 14'.

As illustrated in FIGS. 9 and 9A, slots 24 are provided in the bottom and top plates 10 and 22 of the structure of FIG. 8 extending over one or more of the center conductors 14', as shown in FIG. 9, and having sufficient depth to extend into dielectric layers 12 and 16, as shown in FIG. 9A. These slots 24 may be provided, for example, using chemical milling techniques.

The slots 24 are filled with a dielectric material 25, as illustrated in FIGS. 10 and 10A, which may typically be accomplished using a two-part fluid epoxy resin system, which is applied to the slots 24 and then cured, following which the surfaces of the plates 10 and 22 are sanded smooth and clean.

As illustrated in FIGS. 10 and 10A, the next step involves providing holes 30 in the structure of FIGS. 9 and 9A intercepting respective ones of the center conductors 14'. As illustrated in FIGS. 11 and 11A, each hole 30 is provided with a conductive layer 32 (FIG. 11A) for making electrical connection to its respective center conductor 14'. A conductive land 33 (FIGS. 11 and 11A) encircling each hole 30 is also provided for use in component or terminal lead attachment. The conductive layer 32 and conductive land 33 may be provided for each hole by first using electroless copper processing to provide a metallic coating of, for example, 0.001 inch on all exposed non-conductive surfaces of the structure of FIGS. 10 and 10A. An electroplating resist is then applied to both bottom and top surfaces 10 and 22 excluding the inside of the holes 30 and the surface areas where the lands 33 are to be formed. The holes 30 and lands 33 are then tin-lead plated to the required thickness for component or lead attachment, following which the electroplating resist is removed. The unwanted copper within the areas of the slots 24 is next removed in order to isolate the lands 33. This may typically be accomplished by applying a suitable etching resist which is exposed in those areas within slots 24 where copper is to be removed. A suitable etching solution, such as ferric chloride etchant, is then used to remove the unwanted copper within the areas of the slots 24 to thereby electrically isolate the lands 33 from one another.

It is to be understood that, although the invention has been primarily concerned with a particular embodiment of the invention, many variations and modifications are possible without departing from the spirit of the invention as defined by the appended claims.

The embodiments of the invention in which an exclusive property or privilege is claimed are defined as follows:

1. In a method for fabricating coaxial circuitry,
providing a structure comprised of a conductive base plate having first and second dielectric layers thereon with a conductive layer pattern sandwiched between said dielectric layers, said conductive layer pattern corresponding to the center conductor pattern desired for said coaxial circuitry,
removing selected portions of said dielectric layers so as to form a channel extending to said base plate on each side of a center conductor,
providing conductive material in each channel to a level at least up to the outer surface of the outermost dielectric layer, and
providing a top conductive layer over the outer surface of the outermost dielectric layer and in electrical contact with the conductive material in each channel.

2. In a method for fabricating coaxial circuitry,
providing a conductive base plate,
providing a first dielectric layer having one surface in contact with said base plate and having on the other surface a first conductive layer formed in a pattern corresponding to the desired center conductor pattern of said coaxial circuitry,
providing a second dielectric layer having one surface in contact with said first conductive layer and having on the other surface a second conductive layer formed in a predetermined pattern,
removing selected portions of said dielectric layers as determined by the predetermined pattern of said second conductive layer so as to form a channel on each side of each center conductor extending to said base plate,
providing conductive material in each channel to a level at least up to the outermost surface of said second dielectric layer, and
providing a conductive top layer over said second conductive layer and the conductive filled channels.

3. The invention in accordance with claim 2,
wherein the step of removing selected portions of said dielectric layers is accomplished by selective etching using the predetermined pattern of said second conductive layer to protect those areas from which dielectric is not to be removed.

4. The method in accordance with claim 2, wherein said method includes the additional step of
providing an available electrical connection to a center conductor which is insulated from said base plate, said conductive top layer, and said conductive filled channels.

5. The method in accordance with claim 2, wherein said first dielectric layer and said first conductive layer are provided by laminating a dielectric layer and a conductive foil layer onto said base plate by the application of heat and pressure and selectively etching said conductive foil layer to provide said pattern.

6. The invention in accordance with claim 5, wherein said second dielectric layer and said second conductive layer of predetermined pattern are also provided by laminating and selective etching.

7. The invention in accordance with claim 6, wherein the step of removing selected portions of said dielectric layers is accomplished by selective etching using the predetermined pattern of said second conductive layer to protect those areas from which dielectric is not to be removed.

8. The invention in accordance with claim 7, wherein said method includes the additional steps of forming aligned slots in said base plate and said top conductive layer over a center conductor having a depth sufficient to extend into said dielectric layers, filling said slots with dielectric material, drilling a hole passing through a center conductor and the dielectric material in said slots, and forming a conductive layer on the inside of said hole to provide an available electrical connection to the center conductor through which the hole passes.

References Cited

UNITED STATES PATENTS

| | | | |
|---|---|---|---|
| 3,264,402 | 8/1966 | Shaheen et al. | 29—625 X |
| 3,276,000 | 9/1966 | Davis | 340—174 TF UX |
| 3,335,489 | 8/1967 | Grant | 29—628 |
| 3,352,730 | 11/1967 | Murch | 29—625 X |
| 3,499,219 | 3/1970 | Griff et al. | 174—36 |
| 3,351,816 | 7/1967 | Sears et al. | 174—36 |

OTHER REFERENCES

IBM Tech Disclosure Bulletin, by Peter et al., vol. 10, No. 4, September 1967.

JOHN F. CAMPBELL, Primary Examiner

R. W. CHURCH, Assistant Examiner

U.S. Cl. X.R.

29—628 R, 600 R; 117—212 R; 156—3 R; 174—36 R, 68.5 R; 340—174 MA, 174 VA; 204—15 R